US012482582B2

(12) United States Patent
Bhatt et al.

(10) Patent No.: US 12,482,582 B2

(45) Date of Patent: Nov. 25, 2025

(54) TELECOMMUNICATION CABLE WITH TAPE

(71) Applicant: Sterlite Technologies Limited, Haryana (IN)

(72) Inventors: Darshana Bhatt, Haryana (IN); Sujeet Kumar, Haryana (IN)

( * ) Notice: Subject to any disclaimer, the term of this patent is extended or adjusted under 35 U.S.C. 154(b) by 125 days.

(21) Appl. No.: 18/169,278

(22) Filed: Feb. 15, 2023

(65) Prior Publication Data

US 2023/0290543 A1 Sep. 14, 2023

(51) Int. Cl.

*H01B 11/02* (2006.01)
*H01B 11/00* (2006.01)
*H01B 11/10* (2006.01)

(52) U.S. Cl.

CPC ....... *H01B 11/1041* (2013.01); *H01B 11/002* (2013.01)

(58) Field of Classification Search

CPC . H01B 1/02; H01B 3/44; H01B 7/009; H01B 7/34; H01B 11/002; H01B 11/02; H01B 11/06; H01B 11/08; H01B 11/085; H01B 11/1008; H01B 11/10; H01B 11/12; H01B 11/1041; H01B 13/0036

USPC .............................. 174/34, 36, 102 R–117 R

See application file for complete search history.

(56) References Cited

U.S. PATENT DOCUMENTS

| | | | | | |
|---|---|---|---|---|---|
| 4,510,346 | A * | 4/1985 | Bursh, Jr. | H01B 11/1016 | 174/115 |
| 5,142,100 | A * | 8/1992 | Vaupotic | H01B 11/1025 | 29/857 |
| 5,434,354 | A * | 7/1995 | Baker | H01B 11/1091 | 174/115 |
| 5,486,649 | A * | 1/1996 | Gareis | H01B 11/1016 | 174/10 |
| 6,248,954 | B1 * | 6/2001 | Clark | H01B 11/085 | 174/113 R |
| 6,310,295 | B1 * | 10/2001 | Despard | H01B 11/08 | 174/113 C |
| 7,964,797 | B2 * | 6/2011 | Clark | H01B 11/06 | 174/113 AS |
| 8,487,184 | B2 * | 7/2013 | Rivernider, Jr. | H01B 11/1033 | 174/102 R |
| 2007/0295526 | A1 * | 12/2007 | Stutzman | H01B 11/06 | 174/110 R |
| 2008/0041609 | A1 * | 2/2008 | Gareis | H01B 11/06 | 174/113 C |
| 2010/0218970 | A1 * | 9/2010 | Eshima | H01B 13/141 | 174/108 |
| 2019/0228882 | A1 * | 7/2019 | Thwaites | H01B 3/445 | |

(Continued)

*Primary Examiner* — William H. Mayo, III

(74) *Attorney, Agent, or Firm* — Steven R. Fairchild

(57) ABSTRACT

A telecommunication cable (100) including a plurality of twisted pairs (102) stranded helically around a cable axis, at least two tapes (104, 106) helically wrapped around the plurality of twisted pairs (102) such that that the at least two tapes (104, 106) overlap over the plurality of twisted pair (102), and a sheath (114) encapsulating the at least two tapes (104, 106) wrapped around the plurality of twisted pair (102). In particular, a ratio of first lay length of a first specific twisted pair to second lay length of a second specific twisted pair is in the range of 0.8 to 1.2. Furthermore, a ratio of first lay length of a first specific twisted pair to second lay length of a second specific twisted pair is in the range of 0.5 to 1.5.

9 Claims, 7 Drawing Sheets

(56) References Cited

U.S. PATENT DOCUMENTS

| | | | | |
|---|---|---|---|---|
| 2021/0350956 | A1* | 11/2021 | Kusuma ............... | H01B 11/085 |
| 2022/0093292 | A1* | 3/2022 | Kusuma ................. | H01B 11/04 |

* cited by examiner

300

400

TELECOMMUNICATION CABLE WITH TAPE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Application No. 202111011037 titled "TELECOMMUNICATION CABLE WITH TAPE" filed by the applicant on Mar. 11, 2022, which is incorporated herein by reference in its entirety.

FIELD

Embodiments of the present invention relate to the field of telecommunication cables and more particularly, relate to a telecommunication cable with tape for high speed data transmission.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premises, business, or a private residence.

In a telecommunication cable, data propagates via twisted pair conductors. A conventional twisted pair conductor generally includes two insulated conductors twisted together along a longitudinal axis of the telecommunication cable. The performance of the telecommunication cables having twisted pair conductors is evaluated utilizing parameters like impedance, return loss, propagation delay, attenuation, cross-talk and the like.

Currently, various types and configurations of the telecommunication cable exist. One of the types and configurations includes the telecommunication cable with a tape. Conventionally available telecommunication cables with tape have higher mutual capacitance for specific twisted pairs of conductors. Generally, mutual capacitance is an ability to hold a charge between two adjacent conductors. The specific twisted pair of conductors is a pair that causes the higher mutual capacitance when they come in contact with the tape. To stabilize the mutual capacitance of the specific twisted pair, it is necessary to distant the tape from the specific twisted pair. As a general practice, the insulation thickness of conductors forming the specific twisted pair is increased so that the specific twisted pair is distant from the tape.

Although increasing thickness stabilizes the mutual capacitance, it results in higher propagation delay in the telecommunication cable. Additionally, increasing the thickness of insulation makes the telecommunication cable bulky and costly. Therefore, it is necessary to employ some technique to compensate for the negative effects of propagation delay and mutual capacitance. Currently, there are a few patent applications that provide telecommunication cables with tape.

U.S. Pat. No. 10,232,833B2 titled "Method for operating a brake control system for a rail vehicle comprising a brake system, brake control system, brake system, and rail vehicle" discloses placing shield/tape with two methods. The methods include a fixed tape control method to control the position of the tape overlapping over any one twisted pair and it is fixed thought-out the length of the cable.

U.S. Pat. No. 5,939,668A titled "Patch cable" discloses overlapping of two shields/tapes over the core of the cable. In particular, the overlapping is over the core at two different positions and does not mutually cross each other.

U.S. Pat. No. 10,008,307B1 titled "High frequency shielded communications cables" discloses a cable which has an overall shield covering the core of the cable. In particular, the overlapping is not fixed and can be over any one of the pair of the cable.

US Patent Application Publ. No. 2014262411A1 titled "Extended curl s-shield" discloses a cable with tape separator and shield covering the core of the cable. In particular, the shield has an overlapping section over one of the twisted pairs.

However, there are a number of drawbacks in the current technologies providing telecommunication cables with tape. Conventional solutions provided in the prior arts do not provide controlled overlapping over the specific twisted pair. Moreover, the prior arts also do not disclose technique or arrangement enabling a controlled overlapping of the tape over the specific twisted pair. Due to controlled overlapping of the tape over the specific twisted pair, the tape may be placed distant from the specific twisted pair.

Accordingly, to overcome the disadvantages of the prior arts, there is a need for a technical solution that overcomes the above-stated limitations in the prior arts. The present invention provides a telecommunication cable with tape.

SUMMARY OF THE INVENTION

Embodiments of the present invention relate to a telecommunication cable comprising a plurality of twisted pairs stranded helically around a cable axis, at least two tapes helically wrapped around the plurality of twisted pairs such that that the at least two tapes overlap over the plurality of twisted pair and a sheath encapsulating the at least two tapes wrapped around the plurality of twisted pair. In particular, a ratio of first lay length of a first specific twisted pair to second lay length of a second specific twisted pair is in the range of 0.8 to 1.2.

In accordance with an embodiment of the present invention, a ratio of first lay length of a first specific twisted pair to second lay length of a second specific twisted pair is in the range of 0.5 to 1.5.

In accordance with an embodiment of the present invention, the telecommunication cable further comprises a separator that separates the plurality of twisted pairs.

In accordance with an embodiment of the present invention, each twisted pair comprises exactly two conductors twisted together to form the plurality of twisted pairs.

In accordance with an embodiment of the present invention, each of the plurality of twisted pairs comprises a conductor and an insulator insulating the conductor.

In accordance with an embodiment of the present invention, the at least two tapes comprises a first tape. In particular, the first tape (104) of the at least two tapes is a single layer tape.

In accordance with an embodiment of the present invention, the at least two tapes comprises a second tape. In particular, the second tape of the at least two tapes is a multi-layer tape comprising at least a conductive layer and at least a non-conductive layer.

Another embodiment of the present invention relates to a method of manufacturing a telecommunication cable comprising the steps of twisting two conductors to form a plurality of twisted pairs, stranding the plurality of twisted pairs to form a bunched core, wrapping the at least two tapes around the bunched plurality of twisted pairs such that at least an edge of the at least two tapes overlap over the plurality of twisted pairs and sheathing a sheath layer to encapsulate the bunched core and the at least two tapes. In particular, twisting two conductors to form the plurality of twisted pairs, further comprises the steps of twisting a first specific conductor pair at a first lay length and twisting a second specific conductor pair at a second lay length. Moreover, the at least two conductor pairs are stranded helically around a cable axis to form the bunched core. Furthermore, a ratio of a first lay length to a second lay length of the plurality of twisted pairs is between 0.8 to 1.2.

In accordance with an embodiment of the present invention, the method of manufacturing the telecommunication cable further comprises the steps of employing a separator in the bunched core to separate the plurality of twisted pairs.

In accordance with an embodiment of the present invention, wrapping the at least two tapes further comprises the steps of wrapping a dielectric tape around the plurality of twisted pairs such that dielectric tape overlaps over a first specific conductor pair out of the plurality of twisted pairs and wrapping a non-dielectric tape around the plurality of twisted pairs such that the non-dielectric tape overlaps over a second specific conductor pair out of the plurality of twisted pairs.

In accordance with an embodiment of the present invention, wrapping of the at least two tapes around the plurality of twisted pairs is along a length of the telecommunication cable.

In accordance with an embodiment of the present invention, a ratio of first lay of length of a first specific twisted pair to second lay of length of a second specific twisted pair is in the range of 0.5 to 1.5.

In accordance with an embodiment of the present invention, the plurality of twisted pairs of conductors comprises a first electrical conductor surrounded by a first insulation layer and a second electrical conductor surrounded by a second insulation layer.

In accordance with an embodiment of the present invention, insulation material of the insulator is any of polyolefin, fluoropolymer, foamed polyolefin, foamed fluoropolymer or a combination thereof.

In accordance with an embodiment of the present invention, the sheath is made of any of low smoke zero halogen, foamed polyethylene, polyethylene, polyvinyl chloride, polypropylene, foamed polypropylene, polymeric material and the like.

In accordance with an embodiment of the present invention, each electrical conductor may be an American wire gauge (AWG) conductor acting as data transmission element of the telecommunication cable.

In accordance with an embodiment of the present invention, the separator is made of a material selected from a group of polymer, fluoropolymer or combination thereof.

Yet another embodiment of the present invention relates to a system for applying at least two tapes over a bunched core comprising a first payoff unit to pay off the plurality of twisted pairs, the at least one tape and the separator, a tape payoff unit to pay off a plurality of tapes, a bunching unit to form the bunched core by passing of the plurality of twisted pairs, the at least one tape and the separator, a first tape guide member for placing the at least one tape over the bunched core and a second tape guide member for placing the at least one tape over the bunched core. In particular, the system controls overlapping of the at least two tapes over the specific twisted pairs of the telecommunication cable.

In accordance with an embodiment of the present invention, the system is a tape overlap control set up controlling overlapping of the at least two tapes over specific twisted pairs of conductors.

In accordance with an embodiment of the present invention, the tape guide member controls overlapping of the at least one tape over specific twisted pairs throughout length of the telecommunication cable.

The foregoing objectives of the present invention are attained by providing a telecommunication cable with tape for high speed data transmission.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

ELEMENT LIST

Figure 1:
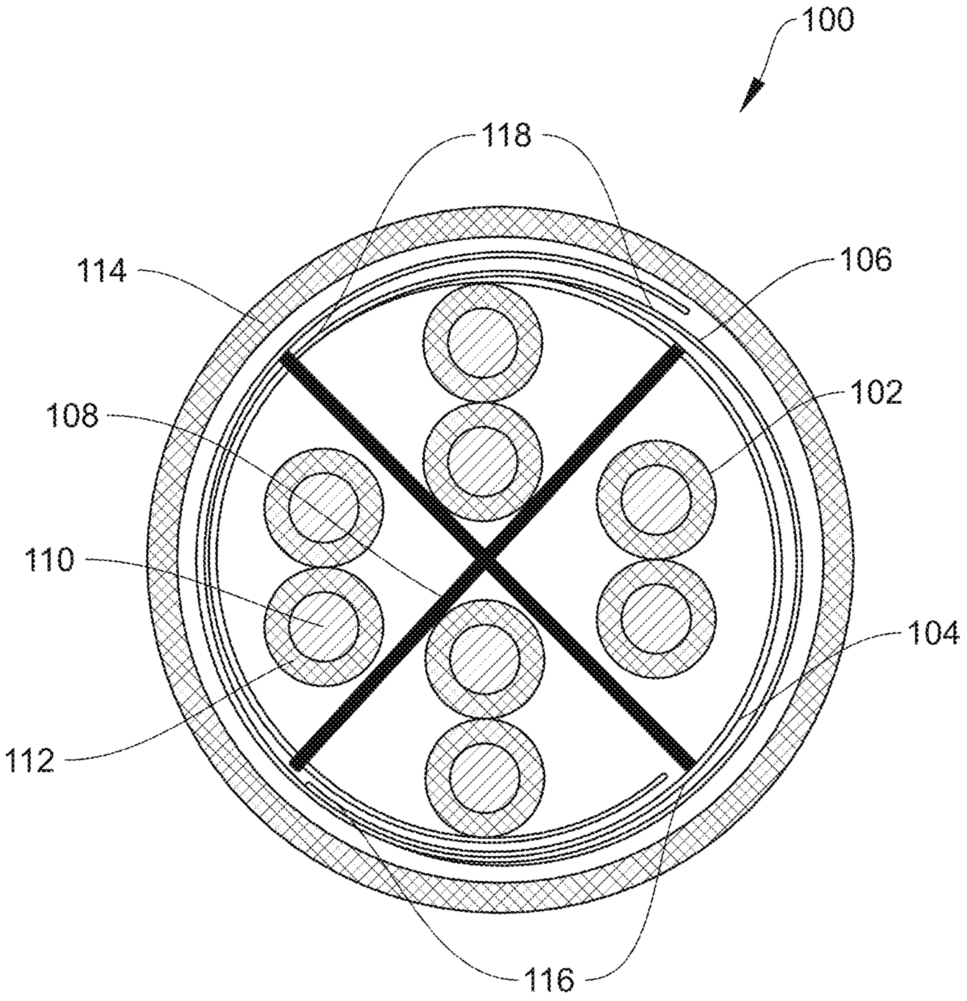
FIG. 1 is a cross-sectional view illustrating a telecommunication cable with at least two tapes overlapping on specific twisted pairs of the telecommunication cable in accordance with one embodiment of the present invention.

Telecommunication cable—100
Plurality of twisted pairs—102
At least two tapes—104, 106
Separator—108
Electrical conductor—110
Insulation layer—112
Sheath—114
Overlap—116, 118
Bunched core—120
Non-conductive layer—502, 506
Conductive layer—504
System—600
First payoff unit—602
Tape payoff unit—604
Bunching unit—606
First tape guide member—608
Second tape guide member—610

The telecommunication cable is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

For a more complete understanding of the present invention, the objects and advantages thereof, reference is now made to the ensuing descriptions.

The principles of the present invention and their advantages are best understood by referring to FIG. 1 to FIG. 7. In the following detailed description, numerous specific details are set forth in order to provide a thorough understanding of the embodiment of the invention as illustrative or exemplary embodiments of the invention, specific embodiments in which the invention may be practised are described in sufficient detail to enable those skilled in the art to practice the disclosed embodiments. However, it will be obvious to a person skilled in the art that the embodiments of the invention may be practised with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

Communication cable consists of copper conductor surrounded by insulation.

AWG is a standardized wire gauge system. In particular, the value of the wire gauge indicates the diameter of the conductors in the cable.

Overlapping is when at least a small part of a tape covers at least a small part of the same tape over a specific twisted pair.

Propagation delay is a measure of time required for a signal to propagate from one end to other of the telecommunication cable. In particular, propagation delay is defined as the flight time of packets over the transmission link. Moreover, propagation delay is the amount of time it takes for the head of the signal to travel from the sender to the receiver. It may be computed as the ratio between the link length and the propagation speed over the specific medium. If the propagation delay is higher, propagation margin is low with respect to the margin defined in the ISO IEC 11801/ANSI-TIA 568 D standard. This increases the latency in the cable and decreases the speed of the signal. However, if the propagation delay is lower then, the propagation margin may be higher with respect to the margin defined in the standard. This may decrease the latency and increase the speed of the signal. Furthermore, both scenarios may make the cable non-compliant with the defined ISO IEC 11801/ANSI-TIA 568 D standard.

Crosstalk is electromagnetic interference produced from one non-shielded twisted pair to another twisted pair, normally running in parallel.

Lay length is the length between the different twist over the twisted pair.

Plurality of characteristics comprises electrical properties and transmission characteristics. In particular, electrical properties include input impedance, conductor resistance, mutual capacitance, resistance unbalance, capacitance unbalance, propagation delay and delay skew. Moreover, transmission characteristics include attenuation, return loss, near end crosstalk, attenuation to crosstalk ratio far end, alien cross talk, power sum attenuation to crosstalk ratio at far end, transverse conversion loss and power sum alien near end cross talk.

Capacitance unbalance is the difference in capacitance between the four conductors of two pairs of twisted insulated conductors. Any difference in the twisted insulated conductor diameter, the insulation thickness, uneven twisting of one or both pairs among the four conductors may result in pair-to-pair capacitance unbalance. Similarly, the lay length and proximity of the two pairs may also affect the capacitance unbalance pair-to-pair. According to ANSI/TIA-568-D & ISO/IEC 11801 Ed. 2.0, to stabilize the capacitance unbalance, the value of capacitance unbalance may be below 160 pF/100 m and the value of mutual capacitance should be below 5.6 nF/100 m.

Attenuation is reduction in strength of a signal travelling through the telecommunication cable 100. The crosstalk may be the near end cross talk, alien cross talk or the like. Moreover, the near end crosstalk is an error condition describing the occurrence of a signal from one wire pair radiating to and interfering with the signal of another wire pair. Similarly, the alien crosstalk is electromagnetic noise occurring in a telecommunication cable 100 running alongside one or more other signal-carrying cables.

Alien refers to alien crosstalk occurring between different cables in a group or bundle and not between individual wires or circuits within a single cable.

Terms "insulation layer 112" or "insulators 112" or "protective coating layer 112" are interchangeably used throughout the draft for convenience.

FIG. 1 is a cross-sectional view illustrating a telecommunication cable 100 with at least two tapes overlapping on specific twisted pairs of the telecommunication cable 100 in accordance with one embodiment of the present invention. The telecommunication cable 100 comprises a plurality of twisted pairs 102 stranded helically around a cable axis, at least two tapes 104, 106 helically wrapped around the plurality of twisted pairs 102 such that that the at least two tapes 104, 106 overlap over the plurality of twisted pair 102 and a sheath 114 encapsulating the at least two tapes 104, 106 wrapped around the plurality of twisted pair 102. In particular, a ratio of first lay length of a first specific twisted pair to second lay length of a second specific twisted pair is in the range of 0.8 to 1.2.

In accordance with an embodiment of the present invention, the telecommunication cable 100 comprises at least two tapes 104, 106 over a core of the telecommunication cable 100. In particular, the telecommunication cable 100 is a twisted pair cable for communication of high speed signal. Moreover, the telecommunication cable 100 further comprises a sheath 114, the at least two tapes 104, 106 and a separator 108.

Furthermore, the telecommunication cable 100 comprises a plurality of twisted pairs 102. The plurality of twisted pairs 102 of conductors comprises insulated conductors used for transferring data and electrical signal. Further, each insulated conductor of the plurality of twisted pairs 102 includes an electrical conductor 110 and an insulation layer 112. The insulated copper conductor are twisted together to form the twisted pair conductor. Each electrical conductor 110 extends substantially along a longitudinal axis of the telecommunication cable 100 and twisted along the length of the telecommunication cable 100. Additionally, the plurality of twisted pairs 102 may be helically twisted along its length to minimize the cross talk in the telecommunication cable 100. In case of four twisted pairs, each of the four twisted pairs comprises two insulated conductors twisted together along a length of the insulated conductors.

In accordance with an embodiment of the present invention, the plurality of twisted pairs 102 of conductors comprises a first electrical conductor and a second electrical conductor. The first electrical conductor may be surrounded by a first insulation layer and a second electrical conductor may be surrounded by a second insulated layer.

In an embodiment, each electrical conductor may be American wire gauge (AWG) conductor acting as data transmission element of the telecommunication cable 100. Each electrical conductor may be of any suitable AWG size. Moreover, each electrical conductor 110 may be of circular shape. Alternatively, each electrical conductor 110 may be of other suitable shape. Furthermore, the electrical conductor 110 may be made of copper. Alternatively, the electrical conductor 110 may be made of any other suitable conductor material.

In one embodiment, each electrical conductor 110 may be enclosed by the insulation layer 112. In particular, the insulation layer 112 may be made of special materials for providing insulation from the electrical conductors 110. An exemplary material of the insulation layer 112 includes insulators, a protective coating layer and the like. Moreover, the insulation layer 112 provides electrical isolation for the electrical conductor 110. Furthermore, the insulation material may have properties like high mechanical strength and high electrical resistance. Further, the insulation material may be but not limited to, polyolefin, fluoropolymer, foamed polyolefin, foamed fluoropolymer or combination thereof.

In accordance with an embodiment of the present invention, the plurality of twisted pairs 102 extends substantially along a longitudinal axis of the telecommunication cable 100 and may be placed suitably.

In an embodiment, each twisted pair comprises exactly two conductors twisted together to form the plurality of twisted pairs 102. In particular, the plurality of twisted pairs 102 may be separated using the separator 108. Moreover, the separator 108 separates the plurality of twisted pairs 102.

In one embodiment, the separator 108 separates the plurality of twisted pairs 102 in the telecommunication cable 100 to suppress the effect of cross talk between the plurality of twisted pairs 102. Particularly, the separator 108 may have any suitable configuration and dimension. The separator 108 may be made of a material selected from a group of polymer or fluoropolymer or combination thereof. Moreover, the separator 108 may align with a center of the telecommunication cable 100. Alternatively, the separator 108 may not align with the center of the telecommunication cable 100. Furthermore, the separator 108 extends along the length of the telecommunication cable 100 and separates the core of the telecommunication cable 100 into various sections.

Further, the plurality of twisted pairs 102 of conductors along with the separator 108 forms the core of the telecommunication cable 100.

Alternatively, the core may be formed by the plurality of twisted pairs 102 and without the separator 108. The core of the telecommunication cable 100 may be surrounded by the at least two tapes 104, 106 to prevent the telecommunication cable 100 from outside electromagnetic interference.

Additionally, the at least two tapes 104, 106 may be single layer tapes or multi-layer tapes. The at least two tapes 104, 106 may be a dielectric tape and a conductive tape. And the at least two tapes 104, 106 may include a first tape 104 and the second tape 106. The first tape 104 wraps at least one pair of conductors and the second tape 106 is placed outside or over the first tape 104. The dielectric tape is a single layer tape and the conductive tape is a multi-layer tape.

In one embodiment, the second tape of the at least two tapes 104, 106 comprises at least a conductive layer and at least a non-conductive layer.

In another embodiment, the second tape 106 is a multi-layer tape. In particular, the multi-layer tape comprises at least a conductive layer 504 and at least a non-conductive layer 502, 506. Moreover, the non-conductive layer 502, 506 defines a dielectric region made of polyester (PET) or any other non-conductive materials. Furthermore, the conductive layer 504 defines conductive or non-dielectric region made of aluminum or any other conductive materials. Further, the three layer second tape 106 may include a continuously conductive tape, a foil, a dielectric material, a combination of a foil and dielectric material, or any other materials. The second tape 106 may be placed over the first tape 104. Additionally, the first tape 104 may overlap at 116 on a first specific twisted pair and the second tape 106 may overlap at 118 on a second specific twisted pair. And, the overlapping of the at least two tapes 104, 106 on the specific twisted pairs is controlled throughout a length of the telecommunication cable 100. The first specific twisted pair and the second specific twisted pair may be present in any of the sections of the telecommunication cable 100.

In accordance with an embodiment of the present invention, the ratio of lay length of the first specific twisted pair to the second specific twisted pair is in a range of 0.8 to 1.2. In particular, the overlapping of the at least two tapes 104, 106 may be on at least one of specific twisted pairs such that the ratio of the lay length of the specific twisted pairs may be in the range of 0.8 to 1.2. If the ratio is below 0.8, propagation delay may be higher. Moreover, if the ratio is beyond 1.2, internal cross talk may be increased.

In an embodiment of the present invention, the ratio of the first lay length of the first specific twisted pair to the second lay length of the second specific twisted pair is in a range of 0.5 to 1.5.

Figure 2:
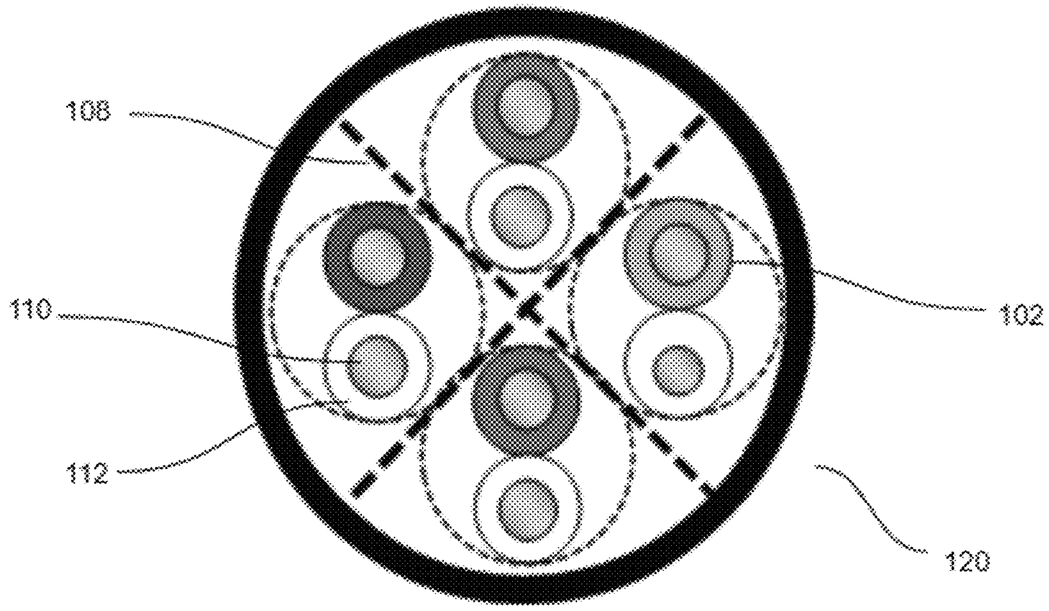
FIG. 2 is a snapshot illustrating a bunched core of the telecommunication cable of with at least two tapes overlapping on specific twisted pairs of the telecommunication cable in accordance with one embodiment of the present invention.

FIG. 2 is a snapshot illustrating a bunched core 120 of the telecommunication cable 100 with at least two tapes 104, 106 overlapping on specific twisted pairs of the telecommunication cable 100 in accordance with one embodiment of the present invention.

In accordance with an embodiment of the present invention, the at least two tapes 104, 106, the plurality of twisted pairs 102 and the separator 108 forms the bunched core 120. In particular, the bunched core 120 and the at least two tapes (104, 106) are enclosed by the sheath 114. The sheath 114 provides insulation from neighboring telecommunication cables and mechanical stability to the telecommunication cable 100. Moreover, the sheath 114 may be made of low smoke zero halogen, foamed polyethylene, polyethylene, polyvinyl chloride, polypropylene, foamed polypropylene, polymeric material and the like.

Figure 3:
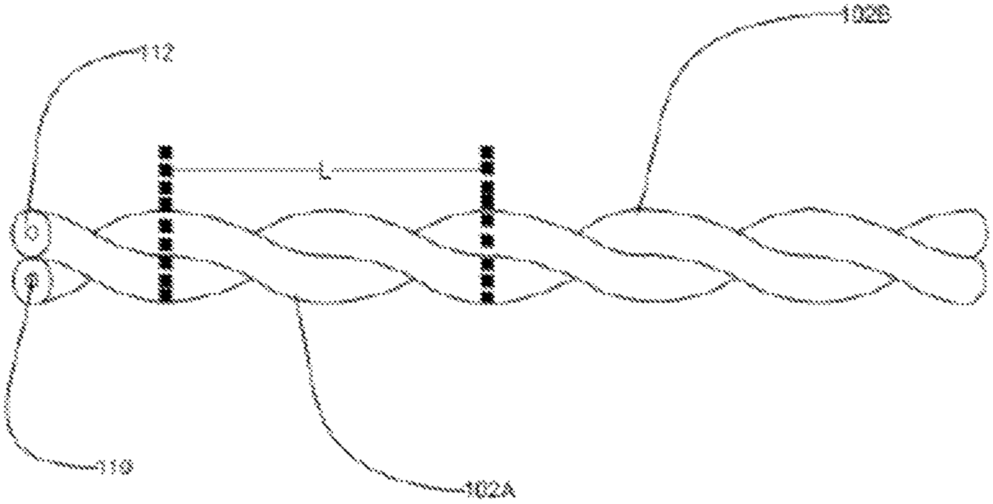
FIG. 3 is a snapshot illustrating a twisted pair of conductors of the telecommunication cable twisted at a lay length in accordance with one embodiment of the present invention.
Figure 4:
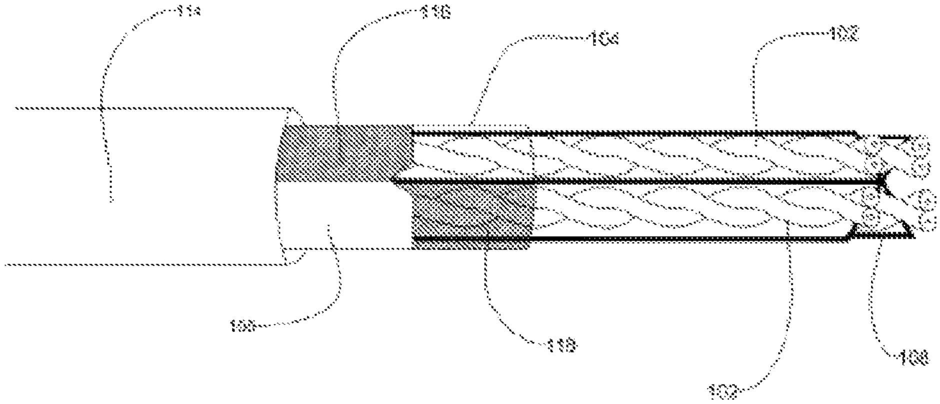
FIG. 4 is a perspective view illustrating a telecommunication cable with at least two tapes overlapping on the specific twisted pairs of the telecommunication cable in accordance with one embodiment of the present invention.

FIG. 3 is a snapshot illustrating a twisted pair of conductors 102 of the telecommunication cable 100 twisted at a lay length in accordance with one embodiment of the present invention;

FIG. 4 is a perspective view illustrating a telecommunication cable 100 with at least two tapes overlapping on the specific twisted pairs of the telecommunication cable 100 in accordance with one embodiment of the present invention.

Figure 5:
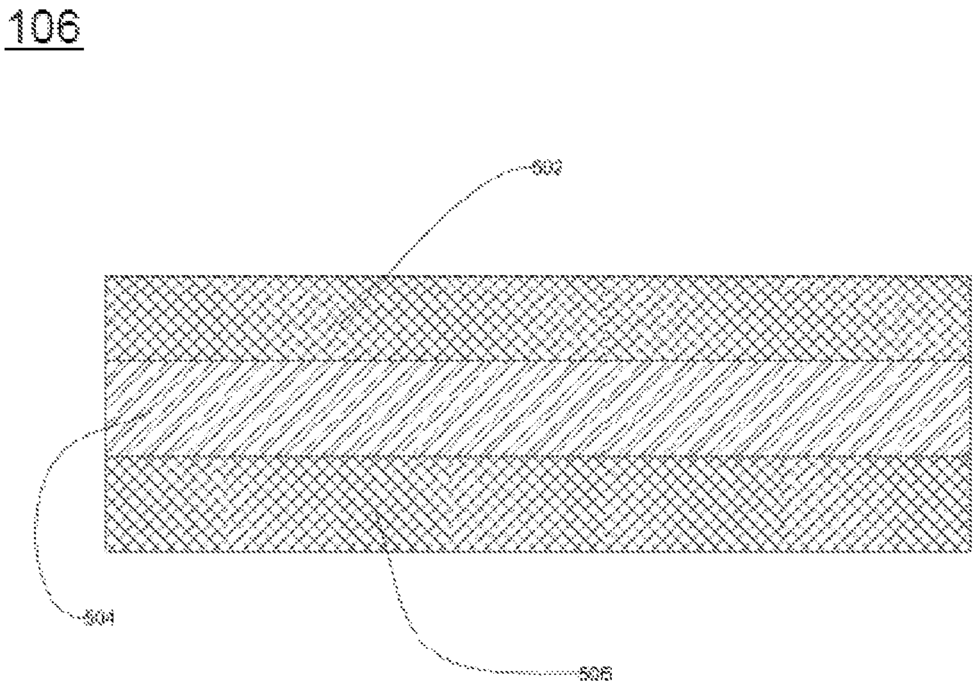
FIG. 5 is a snapshot illustrating a three layer second tape of the at least two tapes of the telecommunication cable in accordance with one embodiment of the present invention.

FIG. 5 is a snapshot illustrating a three layer second tape 106 of the at least two tapes of the telecommunication cable 100 in accordance with one embodiment of the present invention.

Figure 6:
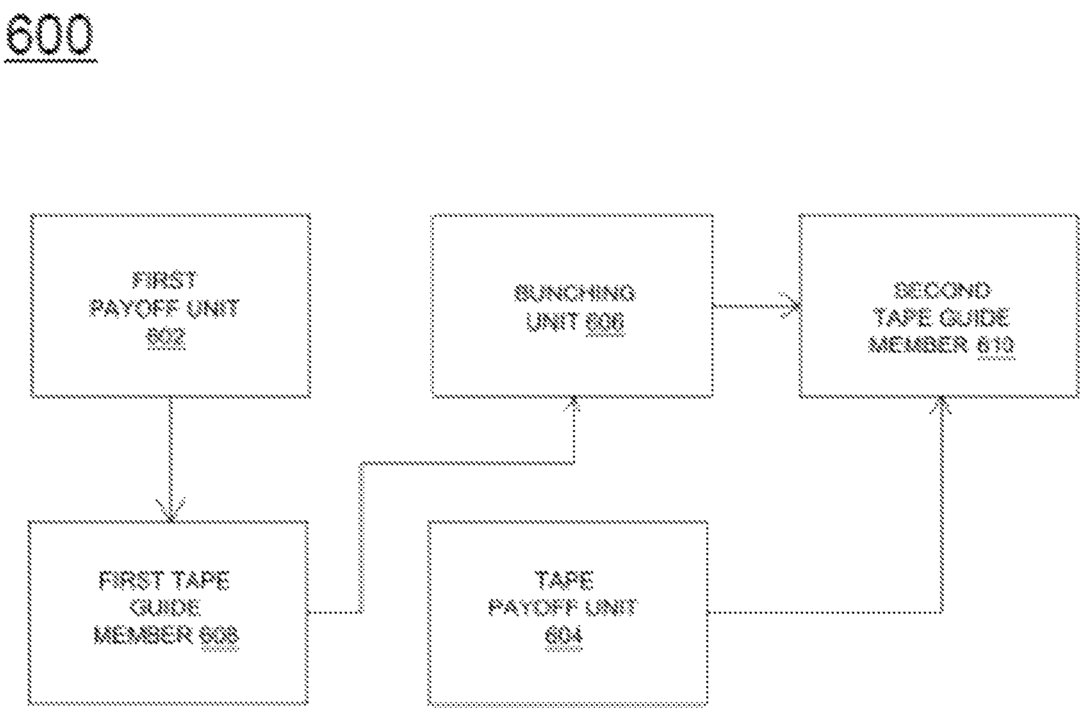
FIG. 6 is a block diagram illustrating a system for applying the at least two tapes over a core and controlling overlapping of the at least two tapes over the specific twisted pairs of the telecommunication cable in accordance with one embodiment of the present invention.

FIG. 6 is a block diagram illustrating a system 600 for applying the at least two tapes 104, 106 over a core and controlling overlapping of the at least two tapes 104, 106 over the specific twisted pairs of the telecommunication cable 100 in accordance with one embodiment of the present invention. In particular, the system 600 controls overlapping of the at least two tapes 104, 106 over the specific twisted pairs of the telecommunication cable 100. The system 600 comprises a first payoff unit 602, a tape payoff unit 604, a bunching unit 606, a first tape guide member 608 and a second tape guide member 610.

In particular, the first payoff unit 602 may comprise a plurality of units to pay off the plurality of twisted pairs 102, the at least one tape 104 and the separator 108. Moreover, the plurality of twisted pairs 102, the at least one tape 104 and the separator 108 is further passed through the bunching unit 606 to form the bunched core 120. Furthermore, the plurality of twisted pairs 102 along with the separator 108 forms the core of the telecommunication cable 100. The core may be made of the plurality of twisted pairs 102 without any separator in between them in case of the telecommunication cable 100 with no separator design. Further, the core is made to bundle with core lay to form the bunched core 120. The core lay is a length between different lay on the bunched core 120.

The tape payoff unit 604 may include a plurality of units to pay off a plurality of tapes.

In an exemplary example, the tape pay off unit 604 provides the at least one tape 106. Particularly, the bunched core 120 from the bunching unit 606 and the at least one tape 106 from the tape payoff unit 604 is passed through the tape guide member 610.

Further, the first tape guide member 608 is responsible for placement of the at least one tape 104 over the bunched 120 core and the second tape guide member 610 is responsible for placement of the at least one tape 106 over the bunched core 120. The at least two tape guide members 608, 610 control the overlapping of the at least two tapes 104, 106 over the bunched core 120 while maintaining the lay length of the twisted pairs such that the overlapping is fixed over the specific twisted pair.

Additionally, the tape guide member 610 controls the overlapping of the at least one tape 106 over the specific twisted pairs throughout the length of the telecommunication cable 100.

In one embodiment, the at least two tapes 104, 106 are applied/placed over the bunched core 120. Particularly, the bunched core 120 comprises the at least one twisted pair 102 and may be the separator 108. The overlapping of the at least two tapes 104, 106 over the specific twisted pairs in the telecommunication cable 100 is controlled.

In accordance with an embodiment of the present invention, the system 600 is a tape overlap control set up. In particular, the tape overlap control set up is used to control the overlapping of the at least two tapes 104, 106 over the specific twisted pairs of conductors.

Figure 7:
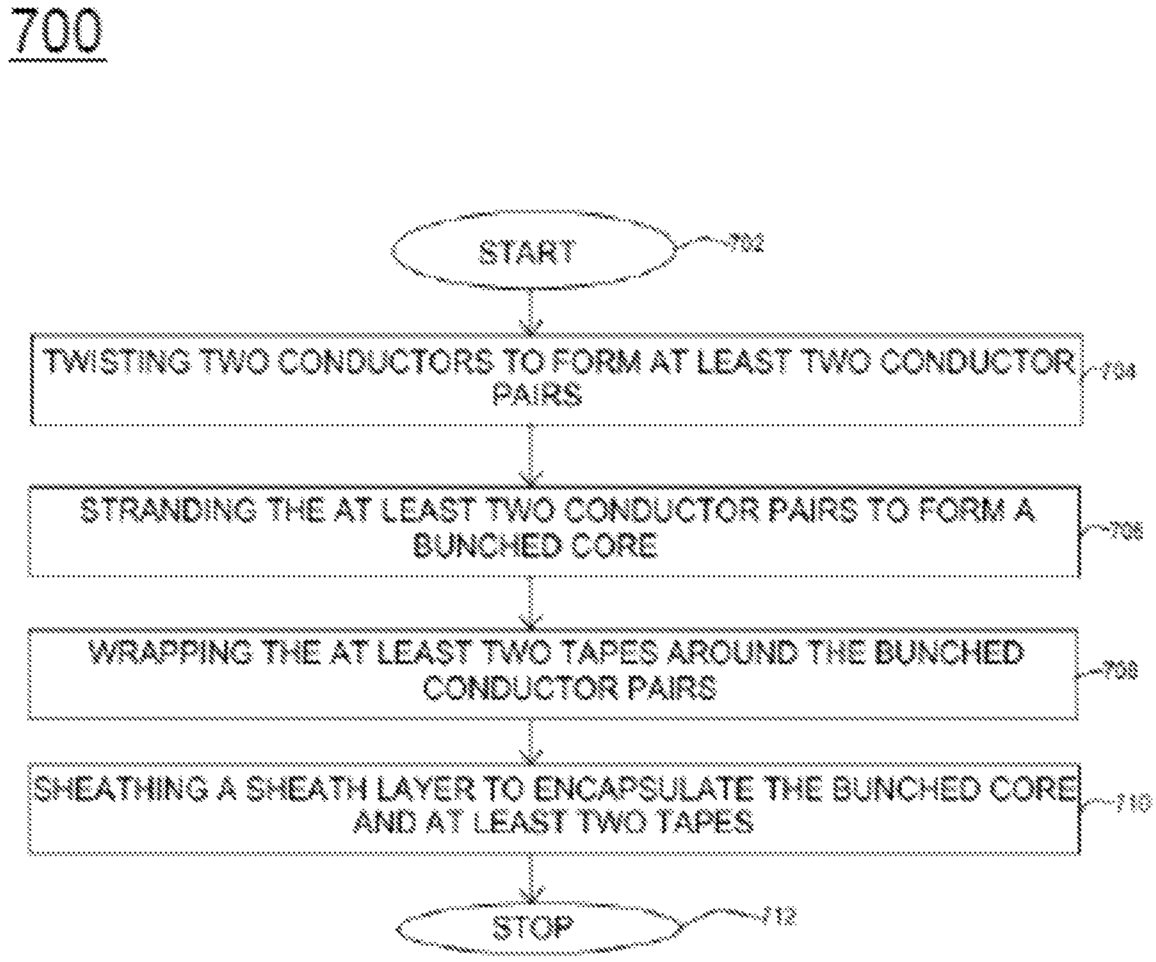
FIG. 7 is a flow-chart illustrating a method for applying the at least two tapes over the core and controlling the overlapping of the at least two tapes over the specific twisted pairs of the telecommunication cable in accordance with one embodiment of the present invention.

FIG. 7 is a flow-chart illustrating a method 700 for applying the at least two tapes 104, 106 over the core and controlling the overlapping of the at least two tapes 104, 106 over the specific twisted pairs of the telecommunication cable 100 in accordance with one embodiment of the present invention. In particular, the method 700 includes controlling the overlap of the at least two tapes 104, 106 over the specific twisted pairs in the telecommunication cable 100. The method 700 starts at step 702 and proceeds to steps 704, 706, 708, 710, 712.

At step 704, two conductors are received and helically twisted together to form the plurality of twisted pairs 102. In particular, the first twisted pair is twisted at a first lay length and the second twisted pair is twisted at a second lay-length.

At step 706, the at least two conductor pairs are stranded or bunched together with the separator 108 to form the bunched core 120. In particular, the bunched core 120 comprises at least one twisted pair of conductor 102 and maybe the separator 108. Moreover, the at least two conductor pairs are stranded helically around a cable axis to form the bunched core 120.

At step 708, the at least two tapes 104, 106 are wrapped around the bunched conductor pairs such that at least an edge of the at least two tapes 104, 106 overlap over the at least two conductor pairs. In particular, the ratio of the first lay-length to the second lay-length of the two conductor pairs is between 0.8 to 1.2. The wrapping the at least two tapes 104, 106 comprises wrapping a dielectric tape around the plurality of twisted pairs 102 such that dielectric tape overlaps over a first conductor pair out of the plurality of twisted pairs 102. Moreover, wrapping the at least two tapes 104, 106 comprises wrapping a non-dielectric tape around the plurality of twisted pairs 102 such that the non-dielectric tape overlaps over a second conductor pair out of the plurality of twisted pairs 102.

At step 710, the sheath layer 114 is sheathed to encapsulate the bunched core 120 and the at least two tapes 104, 106. In particular, the tape guide members 608, 610 control the overlapping of the at least two tapes 104, 106 over the bunched core 120, such that the overlapping is fixed over the specific twisted pairs throughout the length of the telecommunication cable 100.

At step 712 the method is terminated.

It may be noted that the flowchart is explained to have above stated process steps; however, those skilled in the art would appreciate that the flowchart may have more/less number of process steps which may enable all the above stated implementations of the present invention. The various actions, acts, blocks, steps, or the like in the flow chart and sequence diagrams may be performed in the order presented, in a different order or simultaneously. Further, in some implementations, some of the actions, acts, blocks, steps, or the like may be omitted, added, modified, skipped, or the like without departing from the scope of the present invention.

In accordance with an embodiment of the present invention, the overlapping of the first tape is controlled over the first specific twisted pair. In particular, the overlapping of the second tape is controlled over the second specific twisted pair. Moreover, the ratio of the lay length of the first specific twisted pair and the second specific twisted pair is in the range of 0.8 and 1.2. Furthermore, the ratio 0.8 and 1.2 of the first specific twisted pair and the second specific twisted pair improves the internal cross talk and the propagation delay.

Further, the telecommunication cable 100 may have any suitable value of diameter. The telecommunication cable 100 has compact design. The compact design and reduced telecommunication cable diameter enables more telecommunication cable to be placed within a conduit during installation. Additionally, the telecommunication cable 100 is compatible with existing connector specification. The telecommunication cable 100 may be adheres to but not limited to, Cat6a U/UTP, Cat6 F/UTP, cat 6a F/UTP, Cat 6 SFUTP, Cat 6a SFUTP. The structural elements enable an improvement in a plurality of characteristics of the telecommunication cable 100. The telecommunication cable 100 is designed to reduce attenuation and crosstalk.

The present invention of the telecommunication cable 100 with tape provides a number of advantages. The present invention provides a telecommunication cable with tape for high speed transmission of data. Moreover, the present invention enables a controlled overlapping of the tape over a specific twisted pair of conductors. Furthermore, the present invention improves propagation delay, internal cross talk, transmission loss, near end crosstalk. Further, the present invention reduces an overall diameter of the telecommunication cable.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

We claim:

1. A telecommunication cable (100) comprising:

a plurality of twisted pairs (102) stranded helically around a cable axis;

at least two tapes (104, 106) helically wrapped around the plurality of twisted pairs (102), wherein the first tape (104) overlaps at a first specific twisted pair and the second tape (106) overlaps at a second specific twisted pair of the plurality of twisted pairs (102), wherein a ratio of first lay length of a first specific twisted pair to second lay length of a second specific twisted pair is in the range of 0.5 to 1.5; and a sheath (114) encapsulating the at least two tapes (104, 106) wrapped around the plurality of twisted pair (102).

2. The telecommunication cable (100) as claimed in claim 1, further comprising a separator (108), wherein the separator (108) separates the plurality of twisted pairs (102).

3. The telecommunication cable (100) as claimed in claim 1, wherein each twisted pair comprises exactly two conductors twisted together (300) to form the plurality of twisted pairs (102).

4. The telecommunication cable (100) as claimed in claim 1, wherein each of the plurality of twisted pairs (102) comprises a conductor (110) and an insulator (112) insulating the conductor (110).

5. The telecommunication cable (100) as claimed in claim 1, wherein the at least two tapes (104, 106) comprises a first tape (104), wherein the first tape (104) of the at least two tapes (104, 106) is a single layer tape.

6. The telecommunication cable (100) as claimed in claim 1, wherein the at least two tapes (104, 106) comprises a second tape (106), wherein the second tape (106) of the at least two tapes (104, 106) is a multi-layer tape comprising at least a conductive layer (504) and at least a non-conductive layer (502, 506).

7. The telecommunication cable (100) as claimed in claim 1, wherein the plurality of twisted pairs (102) of conductors comprises a first electrical conductor surrounded by a first insulation layer and a second electrical conductor surrounded by a second insulation layer.

8. The telecommunication cable (100) as claimed in claim 1, wherein insulation material of the insulator (112) is any of polyolefin, fluoropolymer, foamed polyolefin, foamed fluoropolymer or a combination thereof.

9. The telecommunication cable (100) as claimed in claim 1, wherein the sheath (114) is made of any of low smoke zero halogen, foamed polyethylene, polyethylene, polyvinyl chloride, polypropylene, foamed polypropylene, polymeric material and the like.

* * * * *